United States Patent
Spizhevoy et al.

(10) Patent No.: US 10,296,792 B2
(45) Date of Patent: May 21, 2019

(54) IRIS BOUNDARY ESTIMATION USING CORNEA CURVATURE

(71) Applicant: Magic Leap, Inc., Plantation, FL (US)

(72) Inventors: Alexey Spizhevoy, Nizhny Novgorod (RU); Gholamreza Amayeh, Santa Clara, CA (US); Adrian Kaehler, Los Angeles, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 15/497,726

(22) Filed: Apr. 26, 2017

(65) Prior Publication Data

US 2018/0018515 A1 Jan. 18, 2018

(30) Foreign Application Priority Data

Jul. 14, 2016 (RU) .................................. 2016128791

(51) Int. Cl.
G06K 9/00 (2006.01)
G06K 9/32 (2006.01)

(52) U.S. Cl.
CPC ....... *G06K 9/00617* (2013.01); *G06K 9/0061* (2013.01); *G06K 9/00604* (2013.01); *G06K 9/3216* (2013.01)

(58) Field of Classification Search
None
See application file for complete search history.

(56) References Cited

U.S. PATENT DOCUMENTS

| | | | |
|---|---|---|---|
| 5,291,560 A | 3/1994 | Daugman | |
| 5,583,795 A * | 12/1996 | Smyth | A61B 3/0025 359/630 |
| 6,850,221 B1 | 2/2005 | Tickle | |
| D514,570 S | 2/2006 | Ohta | |
| 7,771,049 B2 | 8/2010 | Knaan et al. | |
| 7,970,179 B2 | 6/2011 | Tosa | |
| 8,077,914 B1 | 12/2011 | Kaplan | |
| 8,098,891 B2 | 1/2012 | Lv et al. | |
| 8,341,100 B2 | 12/2012 | Miller et al. | |
| 8,345,984 B2 | 1/2013 | Ji et al. | |

(Continued)

FOREIGN PATENT DOCUMENTS

| | | |
|---|---|---|
| WO | WO 2014/182769 | 11/2014 |
| WO | WO 2015/164807 | 10/2015 |
| WO | WO 2018/013199 | 1/2018 |

OTHER PUBLICATIONS

"Convolution", Wikipedia, accessed Oct. 1, 2017, in 17 pages. URL: https://en.wikipedia.org/wiki/Convolution.

(Continued)

Primary Examiner — Delomia L Gilliard
(74) Attorney, Agent, or Firm — Knobbe, Martens, Olson & Bear, LLP

(57) ABSTRACT

Examples of systems and methods for determining a limbic boundary of an iris of an eye are provided. Properties of the corneal bulge can be computed from eye images. An intersection of the corneal bulge with the eye surface (e.g., sclera) can be determined as the limbic boundary. The determined limbic boundary can be used for iris segmentation or biometric applications. A head mounted display can include a camera that images the eye and a processor that analyzes the eye images and determines the limbic boundary.

15 Claims, 5 Drawing Sheets

(56) References Cited

U.S. PATENT DOCUMENTS

| | | | |
|---|---|---|---|
| 8,363,783 B2 | 1/2013 | Gertner et al. | |
| 8,845,625 B2 | 9/2014 | Angeley et al. | |
| 8,950,867 B2 | 2/2015 | Macnamara | |
| 9,081,426 B2 | 7/2015 | Armstrong | |
| 9,141,916 B1 | 9/2015 | Corrado et al. | |
| 9,215,293 B2 | 12/2015 | Miller | |
| 9,262,680 B2 | 2/2016 | Nakazawa et al. | |
| D752,529 S | 3/2016 | Loretan et al. | |
| 9,310,559 B2 | 4/2016 | Macnamara | |
| 9,348,143 B2 | 5/2016 | Gao et al. | |
| D758,367 S | 6/2016 | Natsume | |
| D759,657 S | 7/2016 | Kujawski et al. | |
| 9,417,452 B2 | 8/2016 | Schowengerdt et al. | |
| 9,430,829 B2 | 8/2016 | Madabhushi et al. | |
| 9,470,906 B2 | 10/2016 | Kaji et al. | |
| 9,547,174 B2 | 1/2017 | Gao et al. | |
| 9,671,566 B2 | 6/2017 | Abovitz et al. | |
| D794,288 S | 8/2017 | Beers et al. | |
| 9,740,006 B2 | 8/2017 | Gao | |
| 9,791,700 B2 | 10/2017 | Schowengerdt et al. | |
| D805,734 S | 12/2017 | Fisher et al. | |
| 9,851,563 B2 | 12/2017 | Gao et al. | |
| 9,857,591 B2 | 1/2018 | Welch et al. | |
| 9,874,749 B2 | 1/2018 | Bradski et al. | |
| 2004/0130680 A1 | 7/2004 | Zhou et al. | |
| 2006/0088193 A1 | 4/2006 | Muller et al. | |
| 2006/0147094 A1 | 7/2006 | Yoo | |
| 2007/0140531 A1* | 6/2007 | Hamza | G06K 9/00597 382/117 |
| 2007/0189742 A1* | 8/2007 | Knaan | A61B 3/113 396/18 |
| 2009/0163898 A1* | 6/2009 | Gertner | A61B 3/113 606/4 |
| 2010/0284576 A1* | 11/2010 | Tosa | G06K 9/0061 382/117 |
| 2011/0182469 A1 | 7/2011 | Ji et al. | |
| 2011/0202046 A1* | 8/2011 | Angeley | G06T 7/149 606/6 |
| 2012/0127062 A1 | 5/2012 | Bar-Zeev et al. | |
| 2012/0163678 A1 | 6/2012 | Du et al. | |
| 2013/0082922 A1 | 4/2013 | Miller | |
| 2013/0125027 A1 | 5/2013 | Abovitz | |
| 2014/0071539 A1 | 3/2014 | Gao | |
| 2014/0177023 A1 | 6/2014 | Gao et al. | |
| 2014/0218468 A1 | 8/2014 | Gao et al. | |
| 2014/0270405 A1 | 9/2014 | Derakhshani et al. | |
| 2014/0279774 A1 | 9/2014 | Wang et al. | |
| 2014/0306866 A1 | 10/2014 | Miller et al. | |
| 2014/0380249 A1 | 12/2014 | Fleizach | |
| 2015/0016777 A1 | 1/2015 | Abovitz et al. | |
| 2015/0103306 A1 | 4/2015 | Kaji et al. | |
| 2015/0117760 A1 | 4/2015 | Wang et al. | |
| 2015/0125049 A1 | 5/2015 | Taigman et al. | |
| 2015/0134583 A1 | 5/2015 | Tamatsu et al. | |
| 2015/0154758 A1* | 6/2015 | Nakazawa | A61B 3/113 382/103 |
| 2015/0170002 A1 | 6/2015 | Szegedy et al. | |
| 2015/0178939 A1 | 6/2015 | Bradski et al. | |
| 2015/0205126 A1 | 7/2015 | Schowengerdt | |
| 2015/0222883 A1 | 8/2015 | Welch | |
| 2015/0222884 A1 | 8/2015 | Cheng | |
| 2015/0268415 A1 | 9/2015 | Schowengerdt et al. | |
| 2015/0278642 A1 | 10/2015 | Chertok et al. | |
| 2015/0302652 A1 | 10/2015 | Miller et al. | |
| 2015/0326570 A1* | 11/2015 | Publicover | G06F 21/64 726/4 |
| 2015/0338915 A1 | 11/2015 | Publicover et al. | |
| 2015/0346490 A1 | 12/2015 | TeKolste et al. | |
| 2015/0346495 A1 | 12/2015 | Welch et al. | |
| 2016/0011419 A1 | 1/2016 | Gao | |
| 2016/0026253 A1 | 1/2016 | Bradski et al. | |
| 2016/0034811 A1 | 2/2016 | Paulik et al. | |
| 2016/0035078 A1 | 2/2016 | Lin et al. | |
| 2016/0098844 A1 | 4/2016 | Shaji et al. | |
| 2016/0104053 A1 | 4/2016 | Yin et al. | |
| 2016/0104056 A1 | 4/2016 | He et al. | |
| 2016/0135675 A1 | 5/2016 | Du et al. | |
| 2016/0162782 A1 | 6/2016 | Park | |
| 2017/0053165 A1 | 2/2017 | Kaehler | |
| 2018/0018451 A1 | 1/2018 | Spizhevoy et al. | |

OTHER PUBLICATIONS

"Deep Learning", Wikipedia, printed Oct. 3, 2017, in 23 pages. URL: https://en.wikipedia.org/wiki/Deep_learning.

"Feature Extraction Using Convolution", Ufldl, printed Sep. 1, 2016, in 3 pages. URL:http://deeplearning.stanford.edu/wiki/index.php/Feature_extraction_using_convolution.

"Machine Learning", Wikipedia, printed Oct. 3, 2017, in 14 pages. URL: https://en.wikipedia.org/wiki/Machine_learning.

"Transfer Function Layers", GitHub, Dec. 1, 2015, in 13 pages; accessed URL: http://github.com/torch/nn/blob/master/doc/transfer.md.

Anthony, S., "MIT releases open-source software that reveals invisible motion and detail in video", Extreme Tech, Feb. 28, 2013, as archived Aug. 4, 2017, in 5 pages.

Arevalo J. et al., "Convolutional neural networks for mammography mass lesion classification", in *Engineering in Medicine and Biology Society* (EMBC); 37th Annual International Conference IEEE, Aug. 25-29, 2015, pp. 797-800.

Aubry M. et al., "Seeing 3D chairs: exemplar part-based 2D-3D alignment using a large dataset of CAD models", Proceedings of the IEEE Conference on Computer Vision and Pattern Recognition (Jun. 23-28, 2014); Computer Vision Foundation—Open Access Version in 8 pages.

Badrinarayanan et al., "SegNet: A Deep Convolutional Encoder-Decoder Architecture for Image Segmentation", IEEE (Dec. 8, 2015); arXiv: eprint arXiv:1511.00561v2 in 14 pages.

Bansal A. et al., "Marr Revisited: 2D-3D Alignment via Surface Normal Prediction", Proceedings of the IEEE Conference on Computer Vision and Pattern Recognition (Jun. 27-30, 2016) pp. 5965-5974.

Belagiannis V. et al., "Recurrent Human Pose Estimation", In Automatic Face & Gesture Recognition; 12th IEEE International Conference—May 2017, arXiv eprint arXiv:1605.02914v3; (Aug. 5, 2017) Open Access Version in 8 pages.

Bell S. et al., "Inside-Outside Net: Detecting Objects in Conte t with Skip Pooling and Recurrent Neural Networks", In Proceedings of the IEEE Conference on Computer Vision and Pattern Recognition, Jun. 27-30, 2016; pp. 2874-2883.

Biederman I., "Recognition-by-Components: A Theory of Human Image Understanding", Psychol Rev. (Apr. 1987) 94(2): 115-147.

Bulat A. et al., "Human pose estimation via Convolutional Part Heatmap Regression", arXiv e-print arXiv:1609.01743v1, Sep. 6, 2016 in 16 pages.

Carreira J. et al., "Human Pose Estimation with Iterative Error Feedback", In Proceedings of the IEEE Conference on Computer Vision and Pattern Recognition, Jun. 27-30, 2016, pp. 4733-4742.

Chatfield et al., "Return of the Devil in the Details: Delving Deep into Convolutional Nets", arXiv eprint arXiv:1405.3531v4, Nov. 5, 2014 in 11 pages.

Chen X. et al., "3D Object Proposals for Accurate Object Class Detection", in *Advances in Neural Information Processing Systems*, (2015) Retrieved from <http://papers.nips.cc/paper/5644-3d-object-proposals-for-accurate-object-class-detection.pdf>; 11 pages.

Choy et al., "3D-R2N2: A Unified Approach for Single and Multi-view 3D Object Reconstruction", arXiv; eprint arXiv:1604.00449v1, Apr. 2, 2016 in 17 pages.

Collet et al., "The MOPED framework: Object Recognition and Pose Estimation for Manipulation", The International Journal of Robotics Research. (Sep. 2011) 30(10):1284-306; preprint Apr. 11, 2011 in 22 pages.

Crivellaro A. et al., "A Novel Representation of Parts for Accurate 3D Object Detection and Tracking in Monocular Images", In *Proceedings of the IEEE International Conference on Computer Vision*; Dec. 7-13, 2015 (pp. 4391-4399).

(56) References Cited

OTHER PUBLICATIONS

Dai J. et al., "R-FCN: Object Detection via Region-based Fully Convolutional Networks", in *Advances in neural information processing systems*; (Jun. 21, 2016) Retrieved from <https://arxiv.org/pdf/1605.06409.pdf in 11 pages.
Dai J. et al., "Instance-aware Semantic Segmentation via Multi-task Network Cascades", In *Proceedings of the IEEE Conference on Computer Vision and Pattern Recognition*; Jun. 27-30, 2016 (pp. 3150-3158).
Detone D. et al., "Deep Image Nomography Estimation", arXiv eprint arXiv:1606.03798v1, Jun. 13, 2016 in 6 pages.
Dwibedi et al., "Deep Cuboid Detection: Beyond 2D Bounding Boxes", arXiv eprint arXiv:1611.10010v1; Nov. 30, 2016 in 11 pages.
Everingham M. et al., "The PASCAL Visual Object Classes (VOC) Challenge", Int J Comput Vis (Jun. 2010) 88(2):303-38.
Farabet, C. et al., "Hardware Accelerated Convolutional Neural Networks for Synthetic Vision Systems", Proceedings of the 2010 IEEE International Symposium (May 30-Jun. 2, 2010) Circuits and Systems (ISCAS), pp. 257-260.
Fidler S. et al., "3D Object Detection and Viewpoint Estimation with a Deformable 3D Cuboid Model", Proceedings of the 25th International Conference on Neural Information Processing Systems, (Dec. 3-6, 2012), pp. 611-619.
Fouhey D. et al., "Data-Driven 3D Primitives for Single Image Understanding", Proceedings of the IEEE International Conference on Computer Vision, Dec. 1-8, 2013; pp. 3392-3399.
Geiger A. et al., "Joint 3D Estimation of Objects and Scene Layout", In Advances in Neural Information Processing Systems 24; Dec. 17, 2011 in 9 pages.
Gidaris S. et al., "Object detection via a multi-region & semantic segmentation-aware CNN model", in Proceedings of the IEEE International Conference on Computer Vision; Dec. 7-13, 2015 (pp. 1134-1142).
Girshick R. et al., "Rich feature hierarchies for accurate object detection and semantic segmentation", Proceedings of the IEEE Conference on Computer Vision and Pattern Recognition, Jun. 23-28, 2014 (pp. 580-587).
Girshick R. et al., "Fast R-CNN", Proceedings of the IEEE International Conference on Computer Vision; Dec. 7-13, 2015 (pp. 1440-1448).
Gupta A. et al., "Blocks World Revisited: Image Understanding Using Qualitative Geometry and Mechanics", in European Conference on Computer Vision; Sep. 5, 2010 in 14 pages.
Gupta A. et al., "From 3D Scene Geometry to Human Workspace", in Computer Vision and Pattern Recognition (CVPR); IEEE Conference on Jun. 20-25, 2011 (pp. 1961-1968).
Gupta S. et al., "Learning Rich Features from RGB-D Images for Object Detection and Segmentation", in *European Conference on Computer Vision*; (Jul. 22, 2014); Retrieved from <https://arxiv.org/pdf/1407.5736.pdf> in 16 pages.
Gupta S. et al., "Inferring 3D Object Pose in RGB-D Images", arXiv e-print arXiv:1502.04652v1, Feb. 16, 2015 in 13 pages.
Gupta S. et al., "Aligning 3D Models to RGB-D Images of Cluttered Scenes", in Proceedings of the IEEE Conference on Computer Vision and Pattern Recognition, Jun. 7-12, 2015 (pp. 4731-4740).
Han et al., "Deep Compression: Compressing Deep Neural Networks with Pruning, Trained Quantization and Huffman Coding", arXiv eprint arXiv:1510.00149v5, Feb. 15, 2016 in 14 pages.
Hartley R. et al., *Multiple View Geometry in Computer Vision*, 2nd Edition; Cambridge University Press, (Apr. 2004); in 673 pages.
He et al., "Spatial Pyramid Pooling in Deep Convolutional Networks for Visual Recognition", arXiv eprint arXiv:1406.4729v2; Aug. 29, 2014 in 14 pages.
He et al., "Delving Deep into Rectifiers: Surpassing Human-level Performance on ImageNet Classification", arXiv: eprint arXiv:1502.01852v1, Feb. 6, 2015 in 11 pages.
Hedau V. et al., "Recovering Free Space of Indoor Scenes from a Single Image", in Computer Vision and Pattern Recognition (CVPR), IEEE Conference Jun. 16-21, 2012 (pp. 2807-2814).

Hejrati et al., "Categorizing Cubes: Revisiting Pose Normalization", Applications of Computer Vision (WACV), 2016 IEEE Winter Conference, Mar. 7-10, 2016 in 9 pages.
Hijazi, S. et al., "Using Convolutional Neural Networks for Image Recognition", Tech Rep. (Sep. 2015) available online URL: http://ip.cadence.com/uploads/901/cnn-wp-pdf, in 12 pages.
Hoffer et al., "Deep Metric Learning Using Triplet Network", International Workshop on Similarity-Based Pattern Recognition [ICLR]; Nov. 25, 2015; [online] retrieved from the internet <https://arxiv.org/abs/1412.6622>; pp. 84-92.
Hoiem D. et al., "Representations and Techniques for 3D Object Recognition and Scene Interpretation", Synthesis Lectures on Artificial Intelligence and Machine Learning, Aug. 2011, vol. 5, No. 5, pp. 1-169; Abstract in 2 pages.
Hsiao E. et al., "Making specific features less discriminative to improve point-based 3D object recognition", in *Computer Vision and Pattern Recognition* (CVPR), IEEE Conference, Jun. 13-18, 2010 (pp. 2653-2660).
Huang et al., "Sign Language Recognition Using 3D Convolutional Neural Networks", University of Science and Technology of China, 2015 IEEE International Conference on Multimedia and Expo. Jun. 29-Jul. 3, 2015, in 6 pages.
Iandola F. et al., "SqueezeNet: AlexNet-level accuracy with 50x fewer parameters and <1MB model size", arXiv eprint arXiv:1602.07360v1, Feb. 24, 2016 in 5 pages.
Ioffe S. et al., "Batch Normalization: Accelerating Deep Network Training by Reducing Internal Covariate Shift", International Conference on Machine Learning (Jun. 2015); arXiv: eprint arXiv:1502.03167v3, Mar. 2, 2015 in 11 pages.
Jarrett et al., "What is the Best Multi-Stage Architecture for Object Recognition?", In Computer Vision IEEE 12th International Conference Sep. 29-Oct. 2, 2009, pp. 2146-2153.
Ji, H. et al., "3D Convolutional Neural Networks for Human Action Recognition", IEEE Transactions on Pattern Analysis and Machine Intelligence, vol. 35:1, Jan. 2013, in 11 pages.
Jia Z. et al., "3D-Based Reasoning with Blocks, Support, and Stability", in Proceedings of the IEEE Conference on Computer Vision and Pattern Recognition; Jun. 23-28, 2013 in 8 pages.
Jia Y. et al., "Caffe: Convolutional Architecture for Fast Feature Embedding", in Proceedings of the 22nd ACM International Conference on Multimedia; arXiv eprint arXiv:1408.5093v1 of Jun. 20, 2014 in 4 pages.
Jiang H. et al., "A Linear Approach to Matching Cuboids in RGBD Images", in *Proceedings of the IEEE Conference on Computer Vision and Pattern Recognition*. Jun. 23-28, 2013 (pp. 2171-2178).
Jillela et al., "An Evaluation of Iris Segmentation Algorithms in Challenging Periocular Images", Handbook of Iris Recognition, Springer Verlag, Heidelberg (2012); 28 pages.
Kar A. et al., "Category-specific object reconstruction from a single image", in *Proceedings of the IEEE Conference on Computer Vision and Pattern Recognition*. Jun. 7-12, 2015 (pp. 1966-1974).
Krizhevsky et al., "ImageNet Classification with Deep Convolutional Neural Networks", Advances in Neural Information Processing Systems. Apr. 25, 2013, pp. 1097-1105.
Lavin, A. et al.: "Fast Algorithms for Convolutional Neural Networks", Proceedings of the IEEE Conference on Computer Vision and Pattern Recognition, arXiv: eprint arXiv:1509.09308v2; Nov. 10, 2016 in 9 pages.
Lee D. et al., "Geometric Reasoning for Single Image Structure Recovery", in IEEE Conference Proceedings in Computer Vision and Pattern Recognition (CVPR) Jun. 20-25, 2009, pp. 2136-2143.
Lim J. et al., "FPM: Fine pose Parts-based Model with 3D CAD models", European Conference on Computer Vision; Springer Publishing, Sep. 6, 2014, pp. 478-493.
Liu et al., "ParseNet: Looking Wider to See Better", arXiv eprint arXiv:1506.04579v1; Jun. 15, 2015 in 9 pages.
Liu W. et al., "SSD: Single Shot MultiBox Detector", arXiv e-print arXiv:1512.02325v5, Dec. 29, 2016 in 17 pages.
Long et al., "Fully Convolutional Networks for Semantic Segmentation", Proceedings of the IEEE Conference on Computer Vision and Pattern Recognition (Jun. 7-12, 2015) in 10 pages.

(56) References Cited

OTHER PUBLICATIONS

Pavlakos G. et al., "6-dof object pose from semantic keypoints", in arXiv preprint Mar. 14, 2017; Retrieved from <http://www.cis.upenn.edu/~kostas/mypub.dir/pavlakos17icra.pdf> in 9 pages.
Rastegari M. et al., "XNOR-Net: ImageNet Classification Using Binary Convolutional Neural Networks", arXiv eprint arXiv:1603.05279v4; Aug. 2, 2016 in 17 pages.
Redmon J. et al., "You Only Look Once: Unified, Real-Time Object Detection", Proceedings of the IEEE Conference on Computer Vision and Pattern Recognition (Jun. 27-30, 2016) pp. 779-788.
Ren, J. et al.: "On Vectorization of Deep Convolutional Neural Networks for Vision Tasks," Association for the Advancement of Artificial Intelligence; arXiv: eprint arXiv:1501.07338v1, Jan. 29, 2015 in 8 pages.
Ren S. et al., "Faster R-CNN: Towards real-time object detection with region proposal networks", arXiv eprint arXiv:1506.01497v3; Jan. 6, 2016 in 14 pages.
Roberts L. et al., "Machine Perception of Three-Dimensional Solids", Doctoral Thesis MIT; Jun. 1963 in 82 pages.
Rubinstein, M., "Eulerian Video Magnification", YouTube, published May 23, 2012, as archived Sep. 6, 2017, in 13 pages (with video transcription). URL: https://web.archive.org/web/20170906180503/https://www.youtube.com/watch?v=ONZcjs1Pjmk&feature=youtu.be.
Savarese S. et al., "3D generic object categorization, localization and pose estimation", in *Computer Vision*, IEEE 11th International Conference; Oct. 14-21, 2007, in 8 pages.
Saxena A., "Convolutional Neural Networks (CNNS): An Illustrated Explanation", Jun. 29, 2016 in 16 pages; Retrieved from <http://xrds.acm.org/blog/2016/06/convolutional-neural-networks-cnns-illustrated-explanation/>.
Schroff et al., "FaceNet: A unified embedding for Face Recognition and Clustering", arXiv eprint arXiv:1503.03832v3, Jun. 17, 2015 in 10 pages.
Shafiee et al., "ISAAC: A Convolutional Neural Network Accelerator with In-Situ Analog Arithmetic in Crossbars", ACM Sigarch Comp. Architect News (Jun. 2016) 44(3):14-26.
Shao T. et al., "Imagining the Unseen: Stability-based Cuboid Arrangements for Scene Understanding", ACM Transactions on Graphics. (Nov. 2014) 33(6) in 11 pages.
Simonyan K. et al., "Very deep convolutional networks for large-scale image recognition", arXiv eprint arXiv:1409.1556v6, Apr. 10, 2015 in 14 pages.
Song S. et al., "Sliding Shapes for 3D Object Detection in Depth Images", in European Conference on Computer Vision, (Sep. 6, 2014) Springer Publishing (pp. 634-651).
Song S. et al., "Deep Sliding Shapes for Amodal 3D Object Detection in RGB-D Images", in Proceedings of the IEEE Conference on Computer Vision and Pattern Recognition. Jun. 27-30, 2016 (pp. 808-816).
Su H. et al., "Render for CNN: Viewpoint Estimation in Images Using CNNs Trained with Rendered 3D Model Views", in Proceedings of the IEEE International Conference on Computer Vision, Dec. 7-13, 2015 (pp. 2686-2694).
Szegedy et al., "Going deeper with convolutions", The IEEE Conference on Computer Vision and Pattern Recognition; arXiv, eprint arXiv:1409.4842v1, Sep. 17, 2014 in 12 pages.
Szegedy et al., "Rethinking the Inception Architecture for Computer Vision", arXiv eprint arXIV:1512.00567v3, Dec. 12, 2015 in 10 pages.
Tulsiani S. et al., "Viewpoints and Keypoints", Proceedings of the IEEE Conference on Computer Vision and Pattern Recognition; Jun. 7-12, 2015 (pp. 1510-1519).
Wilczkowiak M. et al., "Using Geometric Constraints Through Parallelepipeds for Calibration and 3D Modelling", IEEE Transactions on Pattern Analysis and Machine Intelligence—No. 5055 (Nov. 2003) 27(2) in 53 pages.
Wu J. et al., "Single Image 3D Interpreter Network", European Conference in Computer Vision; arXiv eprint arXiv:1604.08685v2, Oct. 4, 2016 in 18 pages.
Xiang Y. et al., "Data-Driven 3D Voxel Patterns for Object Category Recognition", in Proceedings of the IEEE Conference on Computer Vision and Pattern Recognition, Jun. 7-12, 2015 (pp. 1903-1911).
Xiao J. et al., "Localizing 3D cuboids in single-view images", in Advances in Neural Information Processing Systems; Apr. 25, 2013 in 9 pages.
Yang Y. et al., "Articulated human detection with flexible mixtures of parts", IEEE Transactions on Pattern Analysis and Machine Intelligence. Dec. 2013; 35(12):2878-90.
Zheng Y. et al., "Interactive Images: Cuboid Pro ies for Smart Image Manipulation", ACM Trans Graph. (Jul. 2012) 31(4):99-109.
International Search Report and Written Opinion for PCT Application No. PCT/US17/29699, dated Sep. 8, 2017.
International Search Report and Written Opinion for PCT Application No. PCT/US2017/034482, dated Aug. 2, 2017.
International Search Report and Written Opinion for PCT Application No. PCT/US2017/048068, dated Nov. 20, 2017.
International Search Report and Written Opinion for PCT Application No. PCT/US2017/054987, dated Dec. 12, 2017.
International Search Report and Written Opinion for PCT Application No. PCT/US2017/061618, dated Jan. 17, 2018.
"Camera Calibration and 3D Reconstruction", OpenCV, retrieved May 5, 2016, in 51 pages. URL: http://docs.opencvorg/2.4/modules/calib3d/doc/camera_calibration_and_3d_reconstruction.html.
"Camera calibration with OpenCV", OpenCV, retrieved May 5, 2016, in 7 pages. URL: http://docs.opencv.org/3.1.0/d4/d94/tutorial_camera_calibration.html#gsc.tab=0.
"Camera calibration with OpenCV", OpenCV, retrieved May 5, 2016, in 12 pages. URL: http://docs.opencv.org/2.4/doc/tutorials/calib3d/camera_calibration/camera_calibration.html.
Adegoke et al., "Iris Segmentation: A Survey", Int J Mod Engineer Res. (IJMER) (Aug. 2013) 3(4): 1885-1889.
Bouget, J., "Camera Calibration Toolbox for Matlab" Cal-Tech, Dec. 2, 2013, in 5 pages. URL: https://www.vision.caltech.edu/bouguetycalib_doc/index.html#parameters.
Daugman, J. et al., "Epigenetic randomness, complexity and singularity of human iris patterns", Proceedings of Royal Society: Biological Sciences, vol. 268, Aug. 2001, in 4 pages.
Daugman, J., "How Iris Recognition Works", IEEE Transactions on Circuits and Systems for Video Technology, vol. 14, No. 1, Jan. 2004, in 10 pages.
Daugman, J., "New Methods in Iris Recognition," IEEE Transactions on Systems, Man, and Cybernetics—Part B: Cybernetics, vol. 37, No. 5, Oct. 2007, in 9 pages.
Daugman, J., "Probing the Uniqueness and Randomness of IrisCodes: Results From 200 Billion Iris Pair Comparisons," Proceedings of the IEEE, vol. 94, No. 11, Nov. 2006, in 9 pages.
Hansen, D. et al., "In the Eye of the Beholder: A Survey of Models for Eyes and Gaze", IEE Transactions on Pattern Analysis and Machine Intelligence, vol. 32, No. Mar. 3, 2010, in 23 pages.
Villanueva, A. et al., "A Novel Gaze Estimation System with One Calibration Point", IEEE Transactions on Systems, Man, and Cybernetics—Part B:Cybernetics, vol. 38:4, Aug. 2008, in 16 pages.
International Search Report and Written Opinion for PCT Application No. PCT/US15/29679, dated Jul. 6, 2017.

\* cited by examiner

IRIS BOUNDARY ESTIMATION USING CORNEA CURVATURE

CROSS-REFERENCE TO RELATED APPLICATIONS

This application claims the benefit of priority to Russian Patent Application Number 2016128791, filed Jul. 14, 2016, entitled "IRIS BOUNDARY ESTIMATION USING CORNEA CURVATURE," the contents of which are hereby incorporated by reference herein in their entirety.

BACKGROUND

Field

The present disclosure relates generally to systems and methods for processing eye imagery and more particularly to identifying a boundary of an iris using measurements of the corneal bulge of the eye.

Description of Related Art

The human iris can be used as a source of biometric information. Biometric information can provide authentication or identification of an individual. The process of extracting biometric information, broadly called a biometric template, typically has many challenges.

SUMMARY

In one aspect, a wearable display system is disclosed. The wearable display system comprises: a display; an image capture device configured to capture an image of an eye of a user; non-transitory memory configured to store executable instructions; and a hardware processor in communication with the display, the image capture device, and the non-transitory memory, the hardware processor programmed by the executable instructions to: obtain a camera calibration; obtain physiological parameters of the eye in a three-dimensional coordinate frame of the eye, wherein the physiological parameters comprise: a radius of a corneal sphere comprising a cornea of the eye, a radius of an iris of the eye, and a distance between a center of the corneal sphere and a center of a pupil of the eye; receive the image of the eye, the image comprising at least a portion of the cornea of the eye and the iris of the eye; determine an intersection between the corneal sphere and the eye; convert, based at least in part on the camera calibration, the intersection from the coordinate frame of the eye to a coordinate frame of the image of the eye; determine the limbic boundary based at least in part on the intersection; and utilize the limbic boundary in a biometric application.

In another aspect, a computer system is disclosed. The computer system comprises: a display; an image capture device configured to capture an image of an eye of a user; non-transitory memory configured to store executable instructions; and a hardware processor in communication with the display, the image capture device, and the non-transitory memory, the hardware processor programmed by the executable instructions to: obtain physiological parameters of the eye in a three-dimensional coordinate frame of the eye, wherein the physiological parameters comprise: a radius of a corneal sphere comprising a cornea of the eye, a radius of an iris of the eye, and a distance between a center of the corneal sphere and a center of the pupil of the eye; receive the image of the eye, the image comprising at least a portion of the cornea of the eye and the iris of the eye; determine an intersection between the corneal sphere and the eye; and determining the limbic boundary based at least in part on the intersection.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

Figure 1A:
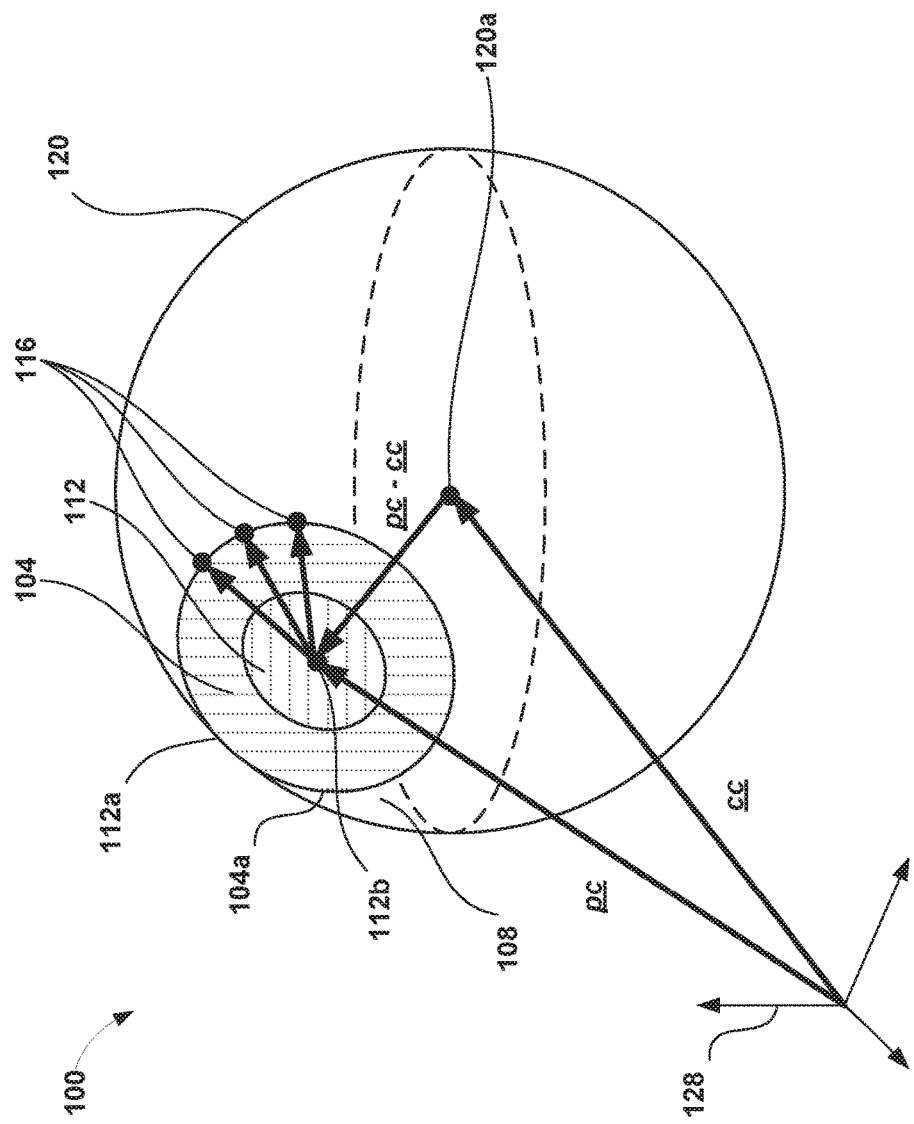
FIG. 1A is a perspective view that schematically illustrates features of an eye and a coordinate system in which an eye imaging camera views the eye.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

Extracting biometric information from the eye generally includes a procedure for the segmentation of the iris within an eye image. Iris segmentation can involve operations including locating the iris boundaries, including finding the (inner) pupillary and (outer) limbic boundaries of the iris, localizing upper or lower eyelids if they occlude the iris, detecting and excluding occlusions of eyelashes, shadows, or reflections, and so forth. For example, the eye image can be included in an image of the face or may be an image of the periocular region.

To perform iris segmentation, both the boundary of the pupil (the interior boundary of the iris) and the limbus (the exterior boundary of the iris) can be identified as separate segments of image data. Identifying the pupillary boundary is typically straightforward, as the pupil absorbs light very effectively and thus provides a reliable, high contrast, boundary. However, the limbus is often much more poorly defined, with the transition to the white sclera of the eye often being much smoother. This difficulty may be even more pronounced when the eye is imaged with infrared light, as is typical in the biometric context.

Because of the less well-defined boundary at the limbus, it is desirable to have a method for limbic boundary identification that is more accurate as well as more precise. In the presence of a soft boundary, both accuracy and precision may suffer when conventional limbic boundary techniques are used. The accuracy problem can arise because the soft boundary is often mistaken by algorithms for other elements of the eye such as the eyelids, eyelashes, or their shadows. At the same time, precision problems can arise because the soft boundary often provides no truly repeatable definition of the segmentation which is robust to lighting and other environmental factors.

The use of the three-dimensional (3-D) geometry of the eye, as opposed to its surface coloration (as used in some conventional techniques), to identify the boundary of the iris, provides an alternative which is both unique, in the sense that there are no other geometric features of the eye with which it can be mistaken, and which is clearly defined, leading to improved reliability. Accordingly, the present disclosure describes techniques to measure the 3-D eye geometry and to use the intersection of the measured corneal bulge with the eye surface (e.g., the sclera) to identify the outer boundary of the iris.

In the context of a wearable head mounted display (HMD), inward-facing eye imaging camera(s) may be relatively close to one or both of the user's eyes. For example, cameras may be mounted on the wearable HMD, which itself is worn by a user. The proximity of the eyes to such a camera can result in higher resolution eye imagery. Accordingly, it is possible to use computer vision techniques to image the eye and extract visual features from the user's eyes such as the shape of the corneal bulge. The intersection of the corneal bulge with the eye surface (e.g., the sclera) can be used to identify the limbic boundary. Further, when viewed by a camera near the eye, the iris of an eye will show detailed structures. Such iris structures can be particularly pronounced when observed under infrared illumination and can be used for biometric identification. These iris features can be unique from user to user and, in the manner of a fingerprint, can be used to identify the user uniquely. The present techniques for identifying the boundaries of the iris can be used to segment the iris and determine a biometric template (often called an iris code), which can be used in biometric applications such as authenticating a user of the HMD.

Structures of an Eye

FIG. 1A schematically illustrates geometry of an eye 100 with iris 104, sclera 108, and pupil 112. FIG. 1A shows the pupillary boundary 112a between the pupil 112 and the iris 104, and the limbic boundary 104a between the iris 104 and the sclera 108 (the "white" of the eye). The determination of points 116 on the limbic boundary 104a (also referred to as the limbic-iris contour) will be described below. The transparent cornea that covers the iris 104 and the pupil 112 is not shown in FIG. 1A.

Figure 1B:
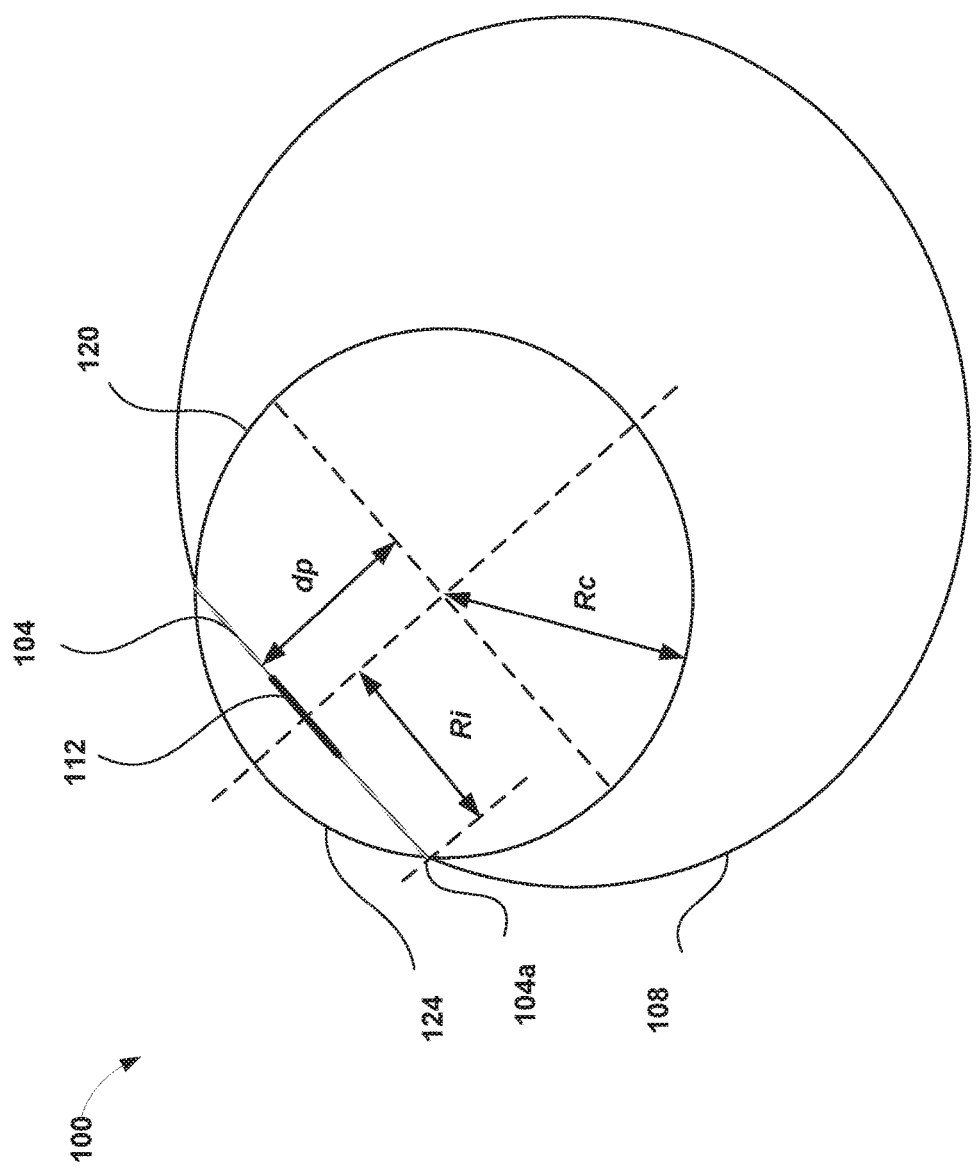
FIG. 1B is a cross-section view of an eye that schematically illustrates physiological parameters of the eye and a corneal sphere that can be used to describe geometry of the cornea.

FIG. 1B is a schematic cross-section view of a corneal sphere 120 that shows the intersection of the cornea 124 and the sclera 108 at the limbic boundary 104a. The portion of the corneal sphere 120 illustrated in FIG. 1B that is below (or behind) the iris 104 and pupil 112 is not physical and is a geometric construction used to describe the approximately spherical shape of the cornea 124. FIG. 1B illustrates some geometrical parameters of the eye 100. The corneal sphere 120 has a radius Rc. The center of the corneal sphere 120 and the center of the pupil 112 are separated by a distance dp. The radius of the iris 104 measured transverse to a line extending from the center of the corneal sphere 120 through the center of the pupil 112 is Ri.

FIG. 1A also shows a coordinate system 128 that can be used to analyze images taken by an eye imaging camera. In this coordinate system 128, the center 120a of the corneal sphere 120 can be located at a vector position cc, and the center of the pupil 112 can be located at a vector position pc.

In the coordinate system 128, a vector from the center 120a of the corneal sphere 120 to the center 112b of the pupil 112 can be given by pc-cc.

Example Methodology for Determining the Limbic Boundary of the Iris

An example methodology for determining the limbic boundary 104a from eye images taken by an image capture device (e.g., an eye imaging camera) can be performed by the HMD. For example, the HMD can include an eye imaging camera that images one or both of the HMD user's eyes. In some HMDs, separate eye imaging cameras are used for each of the user's eyes.

The eye imaging camera can be calibrated. For example, a camera calibration matrix K can be determined. The calibration matrix K depends on intrinsic camera parameters, such as focal lengths (in orthogonal directions) and optical centers (in pixels, typically at the center of the camera image). The calibration of the camera can map the relationship between the camera's natural units (e.g., pixels) and real world units to the eye (e.g., millimeters). The calibration can be performed prior to the eye imaging for a particular user and stored for a particular camera. In some implementations, the camera calibration can be performed during the HMD manufacturing process.

With reference to FIGS. 1A and 1B, the physiological eye parameters Rc, Ri, and dp for the user can be determined. The values of Rc, Ri, and dp can be relatively stable across the human population, with average values being approximately 8 millimeters, 6 millimeters, and 5.3 millimeters, respectively. In some implementations, estimated values typical for the human population can be used by the HMD. In other implementations, one or more of these parameters can be determined for a particular user's eye(s). These parameters can be determined once per user or periodically re-determined for the user. The determination of the parameters Rc, Ri, and dp can be performed using stereoscopy or multiscopic imaging and fitting the corneal and scleral regions to spherical models. Other eye imaging techniques can be used to determine these parameters as well.

The pupil center and the center of the corneal sphere 120 can be estimated in three dimensions. For example, the pupil center can be located in an eye image taken by the eye imaging camera and then transformed, using the camera calibration information or matrix K, into a three-dimensional representation in a coordinate frame of the eye (also referred to eye coordinate frame). The center of the corneal sphere and the distance to the pupil can be located in the coordinate frame of the eye.

A number of points 116 on the limbic boundary 104a can be determined by finding the intersection contour between the corneal sphere 120 and the eye surface (e.g., the sclera 108). The geometrical information about the corneal sphere 120 (e.g., Rc, Ri, dp) can be used to compute the intersection of the corneal sphere with the eye surface to find a number of points 116 that are on the limbic boundary 104a. The points 116 on the boundary 104a may be determined first in the eye coordinate frame, and then re-mapped to the image coordinate plane, frame, or system (or camera image plane). In some implementations, a total of N points 116 generate a regular sampling around the iris, in the coordinate frame of the eye. The points 116 can be projected, using the camera calibration constants, into the image coordinate frame in the image coordinate system of the camera.

The points 116 can be used to determine the limbic boundary 104a. For example, an ellipse, a circle, or another shape can be fit to the generated points 116 in the image coordinate frame. The ellipse defines the limbic boundary, which can then be used to extract iris information. In other implementations, other types of curves can be fit to the points 116, for example, spline curves, ovals, irregular curves (if the iris boundary is irregular). In yet other implementations, the points 116 can be used (without curve-fitting) to define the limbic boundary 104a.

Accordingly, in one example implementation, the following actions are performed. The physiological constants of the eye are computed or estimated, e.g., corneal sphere radius, iris radius, and the distance between the cornea center and the pupil center. The pupil center and the center of the corneal sphere are located in three dimensions. The points in the intersection contour between the corneal sphere and the eye surface are determined, first in the eye coordinate frame, and then remapped to the camera image plane or image coordinate plane, frame, or system. A curve (e.g., an ellipse, a circle, a spline, a polygon, or another shape) is fitted in the image coordinate plane to the remapped points to define the limbic boundary. Optionally, the camera calibration constants can be determined or estimated so that the transformation between the eye coordinate frame and the camera image plane can be determined.

Example Pseudocode for Determining the Limbic Boundary of the Iris in the Image Coordinate Frame The following pseudocode describes an example methodology for determining the limbic boundary in the coordinate frame of the eye image (also referred to as the image coordinate frame). As discussed above with reference to FIGS. 1A and 1B, in the coordinate system 128, the vector from the center of the corneal sphere 120 to the center of the pupil 112 can be represented by pc-cc.

(1) determine a rotation matrix Rmat from (1,0,0) to pc-cc (see FIG. 1A)
(2) for i=0 to num_points−1, do
(2a) θi=i*2*pi/N
(2b) obtain a vector vi from center of corneal sphere to a point on the 3-D iris contour (in canonical coordinate sphere, with aligned visual axis):

$v_i = dp*(1,0,0) + Ri*(\cos(\theta i)*(0,1,0) + \sin(\theta i)*(0,0,1))$ (2c) convert vector $v_i$ into a camera coordinate frame: $v_i' = Rmat*vi$
(2d) project vi' to image using a camera calibration matrix K, and obtain an iris contour point Pi in the image
(3) Fit a curve (e.g., an ellipse, a circle, a spline, a polygon, or another shape) to all {Pi} points In the foregoing example method, a rotation matrix Rmat is determined that describes the rotation between a visual axis of the coordinate system 128 and the vector pc-cc that describes the direction from the center of the corneal sphere 120 to the center of the pupil 112. The number of points 116 on the limbic iris contour 104a is N, and the points 116 can be distributed uniformly in angle θ. The points (indexed by i) on the limbic boundary can be described by a vector $v_i$ in the eye coordinate frame, and these vectors are projected into vectors $v_i'$ (e.g., points 116 on the limbic boundary) in the image coordinate frame (e.g., points 116 on the limbic boundary 104a in FIG. 1) using the camera calibration matrix K. In the image coordinate frame, the limbic contour points $P_i$ define the limbic boundary, and a curve (e.g., an ellipse) can be fit to these contour points.

The orientation of the ellipse can be used to estimate the eye pose (e.g., if the eye were looking directly at the camera, the ellipse would reduce to being circular, and as the eye looks at greater angles away from the camera, the ellipse becomes more flattened). As described above, the points $P_i$ can be fit with other types of curves to describe the possibly irregular shape of the limbic boundary, or the points $P_i$ can be used directly to define the limbic boundary, without fitting a curve. For example, the eye image (in the image coordinate frame) can be transformed, via a perspective transformation, into the coordinate frame of the eye, such that curve fitting of the limbic boundary points (e.g., to an ellipse, a circle, a spline, a polygon, another shape, or one or more curves) may not be utilized.

Example Method for Iris Segmentation Using Corneal Bulge

Figure 2:
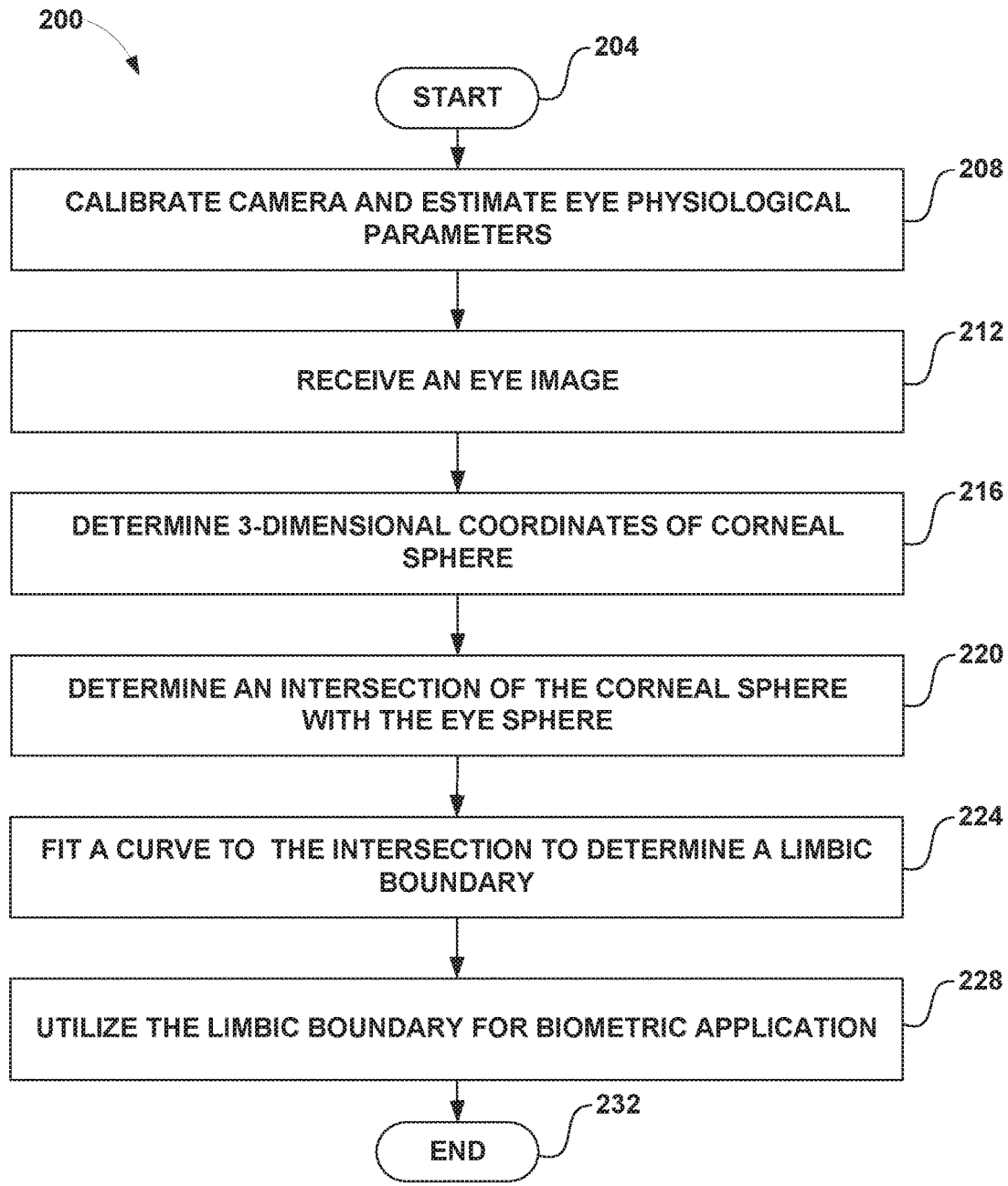
FIG. 2 is a flowchart that illustrates an example method for determining the limbic boundary of an eye and using the limbic boundary in biometric applications.

FIG. 2 is a flowchart that illustrates an example routine 200 for determining the limbic boundary of an eye and using the limbic boundary in biometric applications. The routine 200 begins at block 204. At block 208, the routine 200 obtains camera calibration information and estimates physiological parameters of the eye. At block 208, the eye imaging camera may (optionally) take calibration images and perform the camera calibration (e.g., obtain the camera calibration matrix K). In other implementations, the camera calibration can be performed during manufacturing, and the calibration information is stored in the device. The eye physiological parameters (e.g., Rc, Ri, dp) can be estimated from the general population, or they can be determined for a particular individual from images of the particular individual's eyes.

At block 212, the routine 200 receives an eye image taken by the eye imaging camera. At block 216, the three-dimensional coordinates of the corneal sphere are determined. For example, the pupil center in the center of the corneal sphere 120 in FIGS. 1A-1B can be estimated in three dimensions. The pupil center can be located in an eye image taken by the eye imaging camera and then transformed, using the camera calibration information, into a three-dimensional representation in a coordinate frame of the eye. The center of the corneal sphere and the distance to the pupil can be located in the coordinate frame of the eye.

At block 220, the intersection of the corneal sphere 120 with the eye surface (e.g., the scleral surface 108) is determined. For example, the intersection can include a number of points that are on the limbic boundary 104a. Optionally, at block 224, a curve may be fit to the points determined to be on the limbic boundary. The curve may be an ellipse, a circle, a spline, a polygon, or another shape. In some implementations, multiple curves may be fitted at block 224 such that the limbic boundary 104a is represented by the multiple curves fitted. One or more of the multiple curves can be represented by polynomial forms of any order (such as 2, 3, 4, 5, or more), such as parabolas (quadratic forms) or splines (cubic forms). One or more of the multiple curves need not be a polynomial form of any order. For example, a curve can be another non-linear mathematical expression. Accordingly, an estimate of the limbic boundary can be determined from these intersection points or the fitted curve. In some embodiments, a hardware processor (e.g., a hardware processor of the local processing module 324 in FIG. 3) implementing blocks 216, 220, or 224 can utilize the pseudocode described above to determine the limbic boundary in the eye image.

At block 228, the determined limbic boundary can be used in one or more biometric applications. For example, the determined limbic boundary 104a or the pupillary boundary 112a (e.g., determined by conventional techniques or the methods disclosed herein) can be used to segment the iris. For example, iris segmentation techniques include techniques based on integro-differential operator (e.g., Daugman's method), Hough transform, geodesic active contours, active contours without edges, directional ray detection method, Wilde's method, Camus and Wildes' method, Martin-Roche method, or any combination thereof.

The segmented iris can be used to determine a biometric template of the user's iris. For example, the biometric template can be an iris code determined using wavelet techniques. The iris codes can be computed in a variety of ways. For example in some embodiments, iris codes can be computed according to algorithms developed by John Daugman for iris biometrics (see, e.g., U.S. Pat. No. 5,291,560). For example, the iris code can be based on a convolution of the iris image (in polar coordinates) with 2-D bandpass filters (e.g., Gabor filters), and the iris code can be represented as a two bit number (e.g., whether the response to a particular Gabor filter is positive or negative).

The iris code determined from the eye image can be compared to a database of known iris codes in order to authenticate the user. In another biometric application, the shape of the limbic boundary of the iris can be used to estimate an eye pose of the eye. For example, the eye pose can be estimated based at least partly on the coordinate system 128 of the eye imaging camera and the estimated shape of the limbic boundary 104a. In some embodiments, the eye pose is represented by a normal to a disk bounded by the limbic boundary 104a (the normal can lie along the direction pc-cc shown in FIG. 1A).

Embodiments of the routine 200 can be performed by the wearable display system 300 described below with reference to FIGS. 3 and 4. For example, an eye imaging camera 452 can obtain the eye images, and the local or remote processing modules 324, 328 can analyze the eye images to determine the limbic boundary.

In some implementations, computer vision techniques can be used to one or more aspects of the methods disclosed herein (e.g., to perform iris segmentation, or to image the eye and extract visual features from the user's eyes such as the shape of the corneal bulge). A computer vision module can implement one or more computer vision techniques. Non-limiting examples of computer vision techniques include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

Example Wearable Display System

In some embodiments, display systems can be wearable, which may advantageously provide a more immersive virtual reality (VR) or augmented reality (AR) experience, wherein digitally reproduced images or portions thereof are presented to a wearer in a manner wherein they seem to be, or may be perceived as, real.

Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes. For example, displays containing a stack of waveguides may be configured to be worn positioned in front of the eyes of a user, or viewer. The stack of waveguides may be utilized to provide three-dimensional perception to the eye/brain by using a plurality of waveguides to direct light from an image injection device (e.g., discrete displays or output ends of a multiplexed display which pipe image information via one or more optical fibers) to the viewer's eye at particular angles (and amounts of divergence) corresponding to the depth plane associated with a particular waveguide.

In some embodiments, two stacks of waveguides, one for each eye of a viewer, may be utilized to provide different images to each eye. As one example, an augmented reality scene may be such that a wearer of an AR technology sees a real-world park-like setting featuring people, trees, buildings in the background, and a concrete platform. In addition to these items, the wearer of the AR technology may also perceive that he "sees" a robot statue standing upon the real-world platform, and a cartoon-like avatar character (e.g., a bumble bee) flying by which seems to be a personification of a bumble bee, even though the robot statue and the bumble bee do not exist in the real world. The stack(s) of waveguides may be used to generate a light field corresponding to an input image and in some implementations, the wearable display comprises a light field display.

Figure 3:
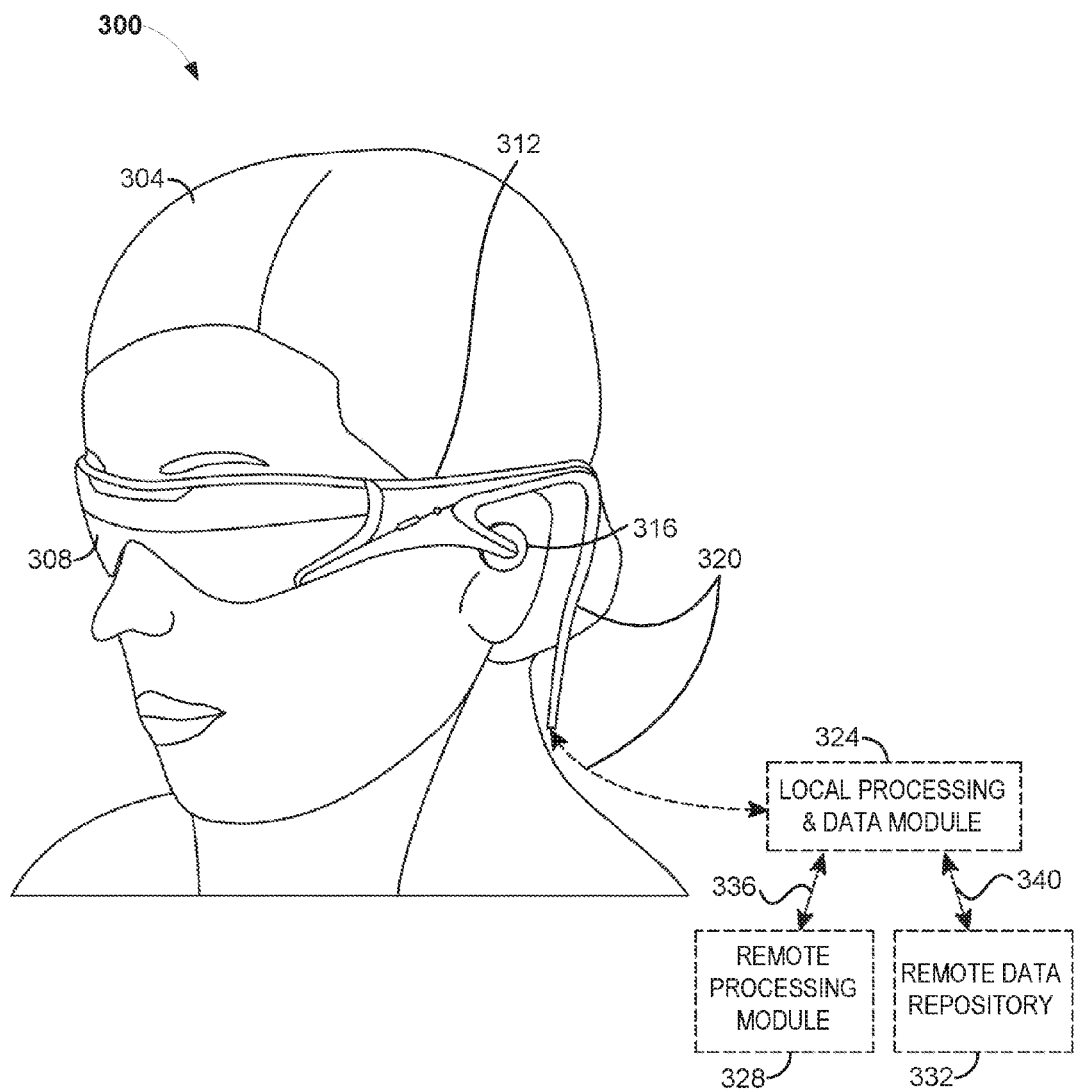
FIG. 3 schematically illustrates an example of a wearable display system.

FIG. 3 illustrates an example of a wearable display system 300 that can be used to present a VR, AR, or MR experience to a display system wearer or viewer 304. The wearable display system 300 may be programmed to perform the iris boundary estimation using cornea curvature techniques or to provide any of the applications or embodiments described herein (e.g., eye image processing). The display system 300 includes a display 308, and various mechanical and electronic modules and systems to support the functioning of the display 308. The display 308 may be coupled to a frame 312, which is wearable by a display system user, wearer, or viewer 304 and which is configured to position the display 308 in front of the eyes of the wearer 304. The display 308 may be a light field display. In some embodiments, a speaker 316 is coupled to the frame 312 and positioned adjacent the ear canal of the user. In some embodiments, another speaker, not shown, is positioned adjacent the other ear canal of the user to provide for stereo/shapeable sound control. The display 308 is operatively coupled 320, such as by a wired lead or wireless connectivity, to a local data processing module 324 which may be mounted in a variety of configurations, such as fixedly attached to the frame 312, fixedly attached to a helmet or hat worn by the user, embedded in headphones, or otherwise removably attached to the user 304 (e.g., in a backpack-style configuration, in a belt-coupling style configuration).

The frame 312 can have one or more cameras attached or mounted to the frame 312 to obtain images of the wearer's eye(s). In one embodiment, the camera(s) may be mounted to the frame 312 in front of a wearer's eye so that the eye can be imaged directly. In other embodiments, the camera can be mounted along a stem of the frame 312 (e.g., near the wearer's ear). In such embodiments, the display 308 may be coated with a material that reflects light from the wearer's eye back toward the camera. The light may be infrared light, since iris features are prominent in infrared images.

The local processing and data module 324 may comprise a hardware processor, as well as non-transitory digital memory, such as non-volatile memory (e.g., flash memory), both of which may be utilized to assist in the processing, caching, and storage of data. The data may include data (a) captured from sensors (which may be, e.g., operatively coupled to the frame 312 or otherwise attached to the user 304), such as image capture devices (such as cameras), microphones, inertial measurement units, accelerometers, compasses, GPS units, radio devices, and/or gyros; and/or (b) acquired and/or processed using remote processing module 328 and/or remote data repository 332, possibly for passage to the display 308 after such processing or retrieval. The local processing and data module 324 may be operatively coupled to the remote processing module 328 and remote data repository 332 by communication links 336 and/or 340, such as via wired or wireless communication links, such that these remote modules 328, 332 are available as resources to the local processing and data module 324. The image capture device(s) can be used to capture the eye images used in the limbic boundary estimation procedures. Eye images can include still images or frames from a video. As used herein, video is used in its ordinary sense and includes, but is not limited to, a recording of a sequence of visual images. Each image in a video is sometimes referred to as an image frame or simply a frame. A video can include a plurality of sequential frames or non-sequential frames, either with or without an audio channel. A video can include a plurality of frames, which are ordered in time or which are not ordered in time. Accordingly, an image in a video can be referred to as an eye image frame or eye image.

In some embodiments, the remote processing module 328 may comprise one or more processors configured to analyze and process data and/or image information such as video information captured by an image capture device. The video data may be stored locally in the local processing and data module 324 and/or in the remote data repository 332. In some embodiments, the remote data repository 332 may comprise a digital data storage facility, which may be available through the internet or other networking configuration in a "cloud" resource configuration. In some embodiments, all data is stored and all computations are performed in the local processing and data module 324, allowing fully autonomous use from a remote module.

In some implementations, the local processing and data module 324 and/or the remote processing module 328 are programmed to perform embodiments of the limbic boundary 104a of the iris as described herein. For example, the local processing and data module 324 and/or the remote processing module 328 can be programmed to perform embodiments of the routine 200 described with reference to FIG. 2 or to perform the example pseudocode above. The local processing and data module 324 and/or the remote processing module 328 can be programmed to use the limbic boundary determination techniques disclosed herein in biometric extraction, for example to identify or authenticate the identity of the wearer 304, or in eye gaze or eyelid shape estimation or pose estimation, for example to determine a direction toward which each eye is looking. The image capture device can capture video for a particular application (e.g., video of the wearer's eye for an eye-tracking application or video of a wearer's hand or finger for a gesture identification application). The video can be analyzed using the limbic boundary identification techniques by one or both of the processing modules 324, 328. With this analysis, processing modules 324, 328 can perform limbic boundary estimation, iris segmentation, and/or biometric extraction, etc. As an example, the local processing and data module 324 and/or the remote processing module 328 can be programmed to store obtained eye images from cameras attached to the frame 312. In addition, the local processing and data module 324 and/or the remote processing module 328 can be programmed to process the eye images using the techniques described herein (e.g., the routine 200). In some implementations, off-loading at least some of the limbic boundary estimation to a remote processing module (e.g., in the "cloud") may improve efficiency or speed of the computations. Various parameters for limbic boundary estimation (e.g., camera calibration matrix K, eye parameters Rc, Ri, dp, rotation matrix Rmat, etc.) can be stored in data modules 324 and/or 328.

The results of the analysis (e.g., the estimated limbic boundary) can be used by one or both of the processing modules 324, 328 for additional operations or processing. For example, in various applications, biometric identification, eye-tracking, recognition, or classification of gestures, objects, poses, etc. may be used by the wearable display system 300. For example, video of the wearer's eye(s) can be used for limbic boundary estimation, which, in turn, can be used by the processing modules 324, 328 to determine or segment the iris for biometric applications such as authentication or determining the direction of the gaze of the wearer 304 through the display 308. The processing modules 324, 328 of the wearable display system 300 can be programmed with one or more embodiments of limbic boundary estimation techniques to perform any of the video or image processing applications described herein.

In some embodiments, the computations performed by the wearable display system 300 can be distributed across components of the wearable display system 300 or components associated with or in communication with the wearable display system 300. In some embodiments, the wearable display system 300 can include a local processing module and local data repository (e.g., the local processing & data module) 324. The wearable display system 300 can be in communication with, or include, a remote processing module 328 and/or a remote data repository 332. The local processing module 324 and/or the remote processing module 328 of the wearable display system 300 can be used to perform any of the methods disclosed herein (e.g., limbic boundary determination). For example, an eye image can be stored in the remote data repository 332, and the remote processing module 328 can determine the limbic boundary in the eye image. As another example, the eye image (or parts of the eye image) can be stored in both the local data repository and the remote data repository 332, and the local processing module 324 and the remote processing module 328 can together determine the limbic boundary in the eye image. The local processing module 324 and the remote processing module 328 can each perform part of limbic boundary determination process. As yet another example, the limbic boundary determination process can be distributed across the local processing module 324 and the remote processing module 328. The distribution of the limbic boundary determination process can be predetermined or determined based on the workload of the local processing module 324 and/or the remote processing module 328. Alternatively or in addition, the distribution of the limbic boundary determination process can be based on the energy (e.g., battery power) available to the local processing module 324 and/or the remote processing module 328.

In some embodiments, the wearable display system (e.g., using the local processing module 324 and/or the remote processing module 328) and/or another computing system (e.g., a computing system on the cloud or a companion computing system of the wearable display system 300) can be used to perform the limbic boundary determination process. The computing system can store and use the entire (or part of) the eye image. For example, the wearable display system 300 can transmit the eye image to the other computing system. After determining the limbic boundary in the eye image, the computing system can transmit the limbic boundary determined back to the wearable display system 300. As another example, the limbic boundary determination process can be distributed across the wearable display system 300 and the computing system. The distribution of the limbic boundary determination process can be determined based on the workload of the wearable display system 300 and/or the computing system. Alternatively or in addition, the distribution of the limbic boundary determination process can be based on the energy (e.g., battery power) available to the wearable display system 300, the battery power remaining of the wearable display system 300, and/or the computing system.

The transmission or communication between the wearable display system 300, the local processing module 324, the local data repository, the remote processing module 328, the remote data repository 332, and/or the other computing system may or may not be encrypted. For example, the transmission between the wearable display system 300 and the computing system may be encrypted. As another example, the transmission between the local processing module 324 and the remote processing module 332 may not be encrypted.

Example Waveguide Stack Assembly

Figure 4:
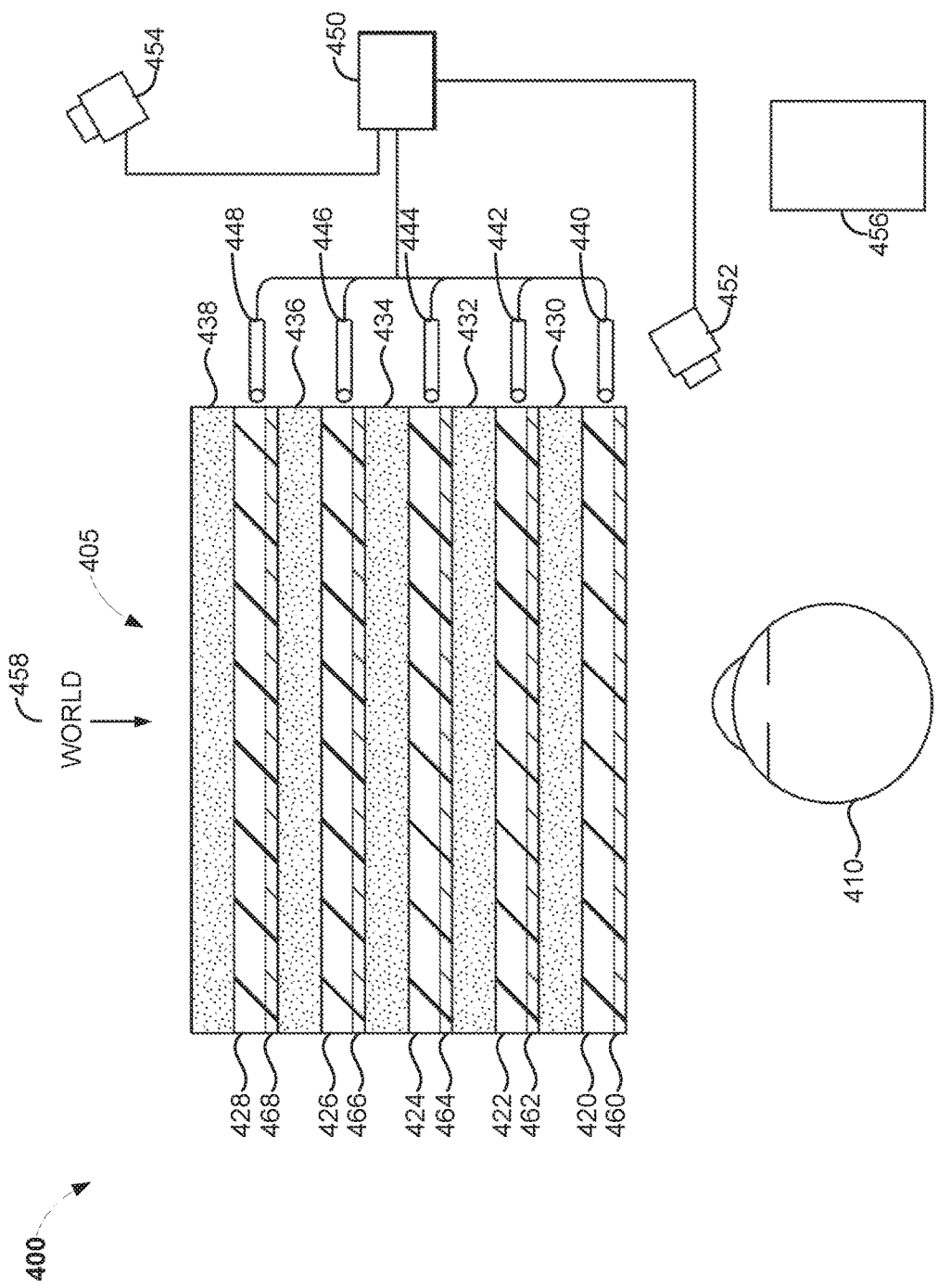
FIG. 4 schematically illustrates an example of a waveguide stack for outputting image information to a user and which can be used in the wearable display system illustrated in FIG. 3.

FIG. 4 illustrates an example of a waveguide stack for outputting image information to a user and which can be used in the wearable display system 300 illustrated in FIG. 3. A display system 400 can include a stack of waveguides, or stacked waveguide assembly 405 that may be utilized to provide three-dimensional perception (e.g., in an AR or VR environment) to the eye 410 or brain using a plurality of waveguides 420, 422, 424, 426, 428. In some embodiments, the display system 400 may correspond to system 300 of FIG. 3, with FIG. 4 schematically showing some parts of that system 300 in greater detail. For example, in some embodiments, the waveguide assembly 405 may be integrated into the display 308 of FIG. 3.

With continued reference to FIG. 4, the waveguide assembly 405 may also include a plurality of features 430, 432, 434, 436 between the waveguides. In some embodiments, the features 430, 432, 434, 436 may be lenses. In some embodiments, the features 430, 432, 434, 436 may not be lenses. Rather, they may be spacers (e.g., cladding layers and/or structures for forming air gaps).

The waveguides 420, 422, 424, 426, 428 and/or the plurality of lenses 430, 432, 434, 436 may be configured to send image information to the eye with various levels of wavefront curvature or light ray divergence. Each waveguide level may be associated with a particular depth plane and may be configured to output image information corresponding to that depth plane. Image injection devices 440, 442, 444, 446, 448 may be utilized to inject image information into the waveguides 420, 422, 424, 426, 428, each of which may be configured to distribute incoming light across each respective waveguide, for output toward the eye 410. Light exits an output surface of the image injection devices 440, 442, 444, 446, 448 and is injected into a corresponding input edge of the waveguides 420, 422, 424, 426, 428. In some embodiments, a single beam of light (e.g., a collimated beam) may be injected into each waveguide to output an entire field of cloned collimated beams that are directed toward the eye 410 at particular angles (and amounts of divergence) corresponding to the depth plane associated with a particular waveguide.

In some embodiments, the image injection devices 440, 442, 444, 446, 442 are discrete displays that each produce image information for injection into a corresponding waveguide 420, 422, 424, 426, 428, respectively. In some other embodiments, the image injection devices 440, 442, 446, 446, 448 are the output ends of a single multiplexed display which may, for example, pipe image information via one or more optical conduits (such as fiber optic cables) to each of the image injection devices 440, 442, 444, 446, 448. Further details regarding the functioning of the waveguide assembly 178 are described in U.S. Patent Publication No. 2015/0016777, which is hereby incorporated by reference herein in its entirety.

A controller 450 controls the operation of the stacked waveguide assembly 405 and the image injection devices 440, 442, 444, 446, 448. In some embodiments, the controller 450 includes programming (e.g., instructions in a non-transitory computer-readable medium) that regulates the timing and provision of image information to the waveguides 420, 422, 424, 426, 428. In some embodiments, the controller 450 may be a single integral device, or a distributed system connected by wired or wireless communication channels. The controller 450 may be part of the processing modules 324 or 328 (illustrated in FIG. 3) in some embodiments. In some embodiments, the controller may be in communication with an inward-facing imaging system 452 (e.g., a digital camera), an outward-facing imaging system 454 (e.g., a digital camera), and/or a user input device 456. The inward-facing imaging system 452 (e.g., a digital camera) can observe the movements of the wearer, such as the eye movements and the facial movements (e.g., of the periocular region). The inward-facing imaging system 452 can be used to capture images of the eye 410 for, for example, determining the size and/or orientation of the eye 100, such as, e.g., the pupil 112, the iris 104, or the cornea 124, determining the direction the wearer 304 is looking (e.g., eye pose), or biometric identification of the wearer 304. The inward-facing imaging system 452 can capture eye images which are used in the limbic boundary estimation method 200. The outward-facing imaging system 454 can be used to image a portion of the world 458 the wearer 304 is seeing. The user can input commands to the controller 450 via the user input device 456 to interact with the display system 400.

In some embodiments, the number and distribution of depth planes and/or depth of field may be varied dynamically based on the pupil sizes and/or orientations of the eyes of the viewer. In some embodiments, an inward-facing imaging system 452 (e.g., a digital camera) may be used to capture images of the eye 410 to determine the size and/or orientation of the pupil of the eye 410. In some embodiments, the inward-facing imaging system 452 may be attached to the frame 312 (as illustrated in FIG. 3) and may be in electrical communication with the processing modules 324 and/or 328, which may process image information from the inward-facing imaging system 452) to determine, e.g., the pupil diameters, orientations of the eyes, the corneal bulge, or eye pose of the user 304.

In some embodiments, one camera may be utilized for each eye, to separately determine the pupil size and/or orientation of each eye, thereby allowing the presentation of image information to each eye to be dynamically tailored to that eye. In some embodiments, at least one camera may be utilized for each eye, to separately determine the pupil size and/or eye pose of each eye independently, thereby allowing the presentation of image information to each eye to be dynamically tailored to that eye. In some other embodiments, the pupil diameter and/or orientation of only a single eye 410 (e.g., using only a single camera per pair of eyes) is determined, and assumed to be similar for both eyes of the viewer 304.

Additional Aspects

In a 1st aspect, a wearable display system is disclosed. The system comprises: a display; an image capture device configured to capture an image of an eye of a user; non-transitory memory configured to store executable instructions; and a hardware processor in communication with the display, the image capture device, and the non-transitory memory, the hardware processor programmed by the executable instructions to: obtain a camera calibration; obtain physiological parameters of the eye in a three-dimensional coordinate frame of the eye, wherein the physiological parameters comprise: a radius of a corneal sphere comprising a cornea of the eye, a radius of an iris of the eye, and a distance between a center of the corneal sphere and a center of a pupil of the eye; receive the image of the eye, the image comprising at least a portion of the cornea of the eye and the iris of the eye; determine an intersection between the corneal sphere and the eye; convert, based at least in part on the camera calibration, the intersection from the coordinate frame of the eye to a coordinate frame of the image of the eye; determine the limbic boundary based at least in part on the intersection; and utilize the limbic boundary in a biometric application.

In a 2nd aspect, the wearable display system of aspect 1, wherein the camera calibration comprises a relationship between a camera coordinate frame and the coordinate frame of the eye.

In a 3rd aspect, the wearable display system of any one of aspects 1-2, wherein the camera calibration comprises a calibration matrix, wherein the calibration matrix comprises intrinsic camera parameters.

In a 4th aspect, the wearable display system of any one of aspects 1-3, wherein the physiological parameters are estimated from a population of human subjects.

In a 5th aspect, the wearable display system of any one of aspects 1-3, wherein to obtain the physiological parameters of the eye, the hardware processor is programmed by the executable instructions to: determining the physiological parameters from images of the eye.

In a 6th aspect, the wearable display system of aspect 5, wherein the hardware processor is further programmed by the executable instructions to periodically re-determine the physiological parameters of the eye.

In a 7th aspect, the wearable display system of any one of aspects 1-6, wherein to determine the intersection between the corneal sphere and the eye, the hardware processor is programmed by the executable instructions to: estimate three-dimensional properties of the corneal sphere in the three-dimensional coordinate frame of the eye.

In a 8th aspect, the wearable display system of aspect 7, wherein to estimate the three-dimensional properties of the corneal sphere, the hardware processor is programmed by the executable instructions to: estimate a center of the pupil and a center of the corneal sphere.

In a 9th aspect, the wearable display system of any one of aspects 1-8, wherein to determine the intersection between the corneal sphere and the eye, the hardware processor is programmed by the executable instructions to: determine a plurality of intersection points of the corneal sphere and the eye.

In a 10th aspect, the wearable display system of aspect 9, wherein to determine the intersection between the corneal sphere and the eye, the hardware processor is further programmed by the executable instructions to: fit a curve to the plurality of intersection points.

In a 11th aspect, the wearable display system of aspect 10, wherein the curve comprises an ellipse.

In a 12th aspect, the wearable display system of any one of aspects 9-11, wherein the plurality of intersection points is determined in the coordinate frame of the eye.

In a 13th aspect, the wearable display system of aspect 12, wherein the hardware processor is further programmed by the executable instructions to: project the plurality of intersection points into the coordinate frame of the image of the eye.

In a 14th aspect, a computer system (e.g., a wearable display system, such as a head mounted display) is disclosed. The system comprises: a display; an image capture device configured to capture an image of an eye of a user; non-transitory memory configured to store executable instructions; and a hardware processor in communication with the display, the image capture device, and the non-transitory memory, the hardware processor programmed by the executable instructions to: obtain physiological parameters of the eye in a three-dimensional coordinate frame of the eye, wherein the physiological parameters comprise: a radius of a corneal sphere comprising a cornea of the eye, a radius of an iris of the eye, and a distance between a center of the corneal sphere and a center of the pupil of the eye; receive the image of the eye, the image comprising at least a portion of the cornea of the eye and the iris of the eye; determine an intersection between the corneal sphere and the eye; and determining the limbic boundary based at least in part on the intersection.

In a 15th aspect, the computer system of aspect 14, wherein to obtain the physiological parameters of the eye, the hardware processor is programmed by the executable instructions to: determine the physiological parameters from eye images of a particular individual.

In a 16th aspect, the computer system of aspect 15, wherein the particular individual is the user.

In a 17th aspect, the computer system of any one of aspects 14-16, wherein the hardware processor is further programmed by the executable instructions to periodically re-determine the physiological parameters of the eye.

In a 18th aspect, the computer system of any one of aspects 14-17, wherein the physiological parameters are estimated for a population of human subjects.

In a 19th aspect, the computer system of any one of aspects 14-18, wherein the image of the eye is received from the image capture device.

In a 20th aspect, the computer system of any one of aspects 14-19, wherein to determine the intersection between the corneal sphere and the eye, the hardware processor is programmed by the executable instructions to: determine the intersection between the corneal sphere and the eye in the three-dimensional coordinate frame of the eye.

In a 21st aspect, the computer system of any one of aspects 14-19, wherein to determine the intersection between the corneal sphere and the eye, the hardware processor is programmed by the executable instructions to: determine the intersection between the corneal sphere and the eye in a coordinate frame of the image.

In a 22nd aspect, the computer system of any one of aspects 14-21, wherein to determine the limbic boundary, the hardware processor is programmed by the executable instructions to: fit a curve to the intersection.

In a 23rd aspect, the computer system of aspect 22, wherein the curve comprises an ellipse.

In a 24th aspect, the computer system of any one of aspects 14-19, wherein to determine the intersection between the corneal sphere and the eye, the hardware processor is programmed by the executable instructions to: determine a plurality of intersection points of the corneal sphere and the eye.

In a 25th aspect, the computer system of aspect 24, wherein to determine the intersection between the corneal sphere and the eye, the hardware processor is further programmed by the executable instructions to: fit a curve to the plurality of intersection points.

In a 26th aspect, the computer system of aspect 25, wherein the curve comprises an ellipse.

In a 27th aspect, the computer system of any one of aspects 24-26, wherein the plurality of intersection points is determined in the coordinate frame of the eye.

In a 28th aspect, the computer system of aspect 27, wherein the hardware processor is further programmed by the executable instructions to: project the plurality of intersection points into the coordinate frame of the image of the eye.

In a 29th aspect, the computer system of any one of aspects 14-28, wherein to determine the intersection between the corneal sphere and the eye, the hardware processor is programmed by the executable instructions to: estimate three-dimensional properties of the corneal sphere in the three-dimensional coordinate frame of the eye.

In a 30th aspect, the computer system of aspect 29, wherein to estimate the three-dimensional properties of the corneal sphere, the hardware processor is programmed by the executable instructions to: estimate a center of the pupil and a center of the corneal sphere.

In a 31st aspect, the computer system of any one of aspects 14-30, wherein the hardware processor is further programmed by the executable instructions to: perform a biometric application based at least in part on the limbic boundary.

In a 32nd aspect, the computer system of aspect 31, wherein the biometric application comprises iris identification.

In a 33rd aspect, the computer system of any one of aspects 14-32, wherein the hardware processor is further programmed by the executable instructions to: obtain a camera calibration.

In a 34th aspect, the computer system of aspect 33, the camera calibration comprises a relationship between a camera coordinate frame and the coordinate frame of the eye.

In a 35th aspect, the computer system of any one of aspects 33-34, wherein the camera calibration comprises a calibration matrix, wherein the calibration matrix comprises intrinsic camera parameters.

In a 36th aspect, the computer system of any one of aspects 14-35, wherein the hardware processor is further programmed by the executable instructions to: convert, based at least in part on the camera calibration, the intersection from the coordinate frame of the eye to a coordinate frame of the image of the eye.

In a 37th aspect, a method for limbic boundary estimation is disclosed. The method is under control of a hardware processor. The method can be applied to an eye image (e.g., from a video frame).

In a 38th aspect, a system is disclosed. The system comprises a camera configured to image an eye of a user; and a hardware processor in communication with the camera, the hardware processor is programmed to analyze an eye image of an eye of a user captured by the camera.

In a 39th aspect, the system of aspect 38, wherein the hardware processor is programmed to implement any method described herein for determining a limbic boundary of the eye in the eye image.

In a 40th aspect, the system of aspect 39, wherein the hardware processor is programmed to use the determined limbic boundary to segment an iris from the eye image.

In a 41st aspect, the system of any one of aspects 38-40, wherein the hardware processor is programmed to use the limbic boundary in the extraction, computation, or determination of biometric information of the user.

In a 42nd aspect, the system of any one of aspects 38-41, wherein the hardware processor is programmed to transform the eye image into a coordinate frame of the eye.

In a 43rd aspect, the system of aspect 42, wherein to transform the eye image into the coordinate frame of the eye, the hardware processor is programmed to transform the eye image, via perspective transformation, into the coordinate frame of the eye.

In a 44th aspect, the system of any one of aspects 42-43, wherein curve fitting of the limbic boundary (e.g., to an ellipse or some other regular or irregular curve) is not utilized (e.g., in this coordinate frame, the limbus is substantially circular).

In a 45th aspect, the system of any one of aspects 38-44, wherein the system comprises a head-mounted augmented reality, mixed reality, or virtual reality display system.

In a 46th aspect, the system of aspect 45, wherein the display system comprises a light field display system.

CONCLUSION

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, actions, or functionalities in flow diagrams, pseudocode, or methods described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some implementations be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, actions, and/or steps. Thus, such conditional language is not generally intended to imply that features, elements, actions, and/or steps are in any way required for one or more embodiments or that one or more embodiments necessarily include logic for deciding, with or without author input or prompting, whether these features, elements, actions, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some implementations, the actions recited in the claims can be performed in a different order and still achieve desirable results

What is claimed is:

1. A wearable display system comprising:
a display;
an image capture device configured to capture an image of an eye of a user;
non-transitory memory configured to store executable instructions; and
a hardware processor in communication with the display, the image capture device, and the non-transitory memory, the hardware processor programmed by the executable instructions to:
obtain a camera calibration;
obtain physiological parameters of the eye in a three-dimensional coordinate frame of the eye, wherein the physiological parameters comprise:
a radius of a corneal sphere comprising a cornea of the eye,
a radius of an iris of the eye, and
a distance between a center of the corneal sphere and a center of a pupil of the eye;
receive the image of the eye, the image comprising at least a portion of the cornea of the eye and the iris of the eye;
transform the image of the eye into the coordinate frame of the eye via a perspective transformation to generate a transformed image;
determine, from the transformed image, an intersection between the corneal sphere and the eye;
convert, based at least in part on the camera calibration, the intersection from the coordinate frame of the eye to a coordinate frame of the image of the eye;
determine the limbic boundary based at least in part on the intersection; and
utilize the limbic boundary in a biometric application.

2. The wearable display system of claim 1, wherein the camera calibration comprises a relationship between a camera coordinate frame and the coordinate frame of the eye.

3. The wearable display system of claim 1, wherein the camera calibration comprises a calibration matrix, wherein the calibration matrix comprises intrinsic camera parameters.

4. The wearable display system of claim 1, wherein the physiological parameters are estimated from a population of human subjects.

5. The wearable display system of claim 1, wherein to obtain the physiological parameters of the eye, the hardware processor is programmed by the executable instructions to: determining the physiological parameters from images of the eye.

6. The wearable display system of claim 5, wherein the hardware processor is further programmed by the executable instructions to periodically re-determine the physiological parameters of the eye.

7. The wearable display system of claim 1, wherein to determine the intersection between the corneal sphere and the eye, the hardware processor is programmed by the executable instructions to: estimate three-dimensional properties of the corneal sphere in the three-dimensional coordinate frame of the eye.

8. The wearable display system of claim 7, wherein to estimate the three-dimensional properties of the corneal sphere, the hardware processor is programmed by the executable instructions to: estimate a center of the pupil and a center of the corneal sphere.

9. The wearable display system of claim 1, wherein to determine the intersection between the corneal sphere and the eye, the hardware processor is programmed by the executable instructions to: determine a plurality of intersection points of the corneal sphere and the eye.

10. The wearable display system of claim 9, wherein to convert the intersection from the coordinate frame of the eye to a coordinate frame of the image of the eye, the hardware processor is programmed by the executable instructions to: project the plurality of intersection points into the coordinate frame of the image of the eye.

11. A wearable display system comprising:
a display;
an image capture device configured to capture an image of an eye of a user;
non-transitory memory configured to store executable instructions; and
a hardware processor in communication with the display, the image capture device, and the non-transitory memory, the hardware processor programmed by the executable instructions to:
obtain physiological parameters of the eye in a three-dimensional coordinate frame of the eye, wherein the physiological parameters comprise:
a radius of a corneal sphere comprising a cornea of the eye,
a radius of an iris of the eye, and
a distance between a center of the corneal sphere and a center of the pupil of the eye;
receive the image of the eye, the image comprising at least a portion of the cornea of the eye and the iris of the eye;
transform the image of the eye into the coordinate frame of the eye via a perspective transformation to generate a transformed image;
determine, from the transformed image, an intersection between the corneal sphere and the eye; and
determining the limbic boundary based at least in part on the intersection.

12. The wearable display system of claim 11, wherein to obtain the physiological parameters of the eye, the hardware processor is programmed by the executable instructions to: determine the physiological parameters from eye images of a particular individual.

13. The wearable display system of claim 11, wherein the image of the eye is received from the image capture device.

14. The wearable display system of claim 11, wherein to determine the limbic boundary, the hardware processor is programmed by the executable instructions to: determine a plurality of intersection points of the corneal sphere and the eye.

15. The wearable display system of claim 11, wherein the hardware processor is further programmed by the executable instructions to: perform a biometric application based at least in part on the limbic boundary, and wherein the biometric application comprises iris identification.

* * * * *